United States Patent
Shimoda et al.

(10) Patent No.: US 9,555,847 B2
(45) Date of Patent: Jan. 31, 2017

(54) SUSPENSION ASSEMBLY TRANSPORT DEVICE

(71) Applicant: HONDA MOTOR CO., LTD., Minato-Ku, Tokyo (JP)

(72) Inventors: Toshihisa Shimoda, Tokyo (JP); Isamu Ishizaki, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/780,628

(22) PCT Filed: Mar. 25, 2014

(86) PCT No.: PCT/JP2014/058225
§ 371 (c)(1),
(2) Date: Sep. 28, 2015

(87) PCT Pub. No.: WO2014/157167
PCT Pub. Date: Oct. 2, 2014

(65) Prior Publication Data
US 2016/0052576 A1   Feb. 25, 2016

(30) Foreign Application Priority Data
Mar. 29, 2013  (JP) .................... 2013-073832

(51) Int. Cl.
  *B62D 65/02* (2006.01)
  *B62D 65/12* (2006.01)
  *B62D 65/18* (2006.01)

(52) U.S. Cl.
  CPC ............ *B62D 65/022* (2013.01); *B62D 65/12* (2013.01); *B62D 65/18* (2013.01)

(58) Field of Classification Search
  CPC .................................. B62D 65/022

USPC ............ 294/67.22, 67.31, 67.21, 81.1, 81.2, 81.3,294/81.4, 81.41, 81.51, 81.56; 414/563
See application file for complete search history.

(56) References Cited

U.S. PATENT DOCUMENTS

| | | | | |
|---|---|---|---|---|
| 4,261,108 A | * | 4/1981 | Davis | G01B 5/255 33/203.18 |
| 5,168,632 A | * | 12/1992 | Rimlinger, Jr. | G01B 5/255 33/203.18 |
| 5,619,800 A | * | 4/1997 | Unruh | G01B 5/255 33/203.15 |
| 5,757,084 A | * | 5/1998 | Wagner | B60B 27/001 29/894.361 |

(Continued)

FOREIGN PATENT DOCUMENTS

| | | |
|---|---|---|
| GB | 2 414 009 A | 11/2005 |
| JP | S62-79786 U | 5/1987 |

(Continued)

*Primary Examiner* — Paul T Chin
(74) *Attorney, Agent, or Firm* — Carrier Blackman & Associates, P.C.; William D. Blackman; Joseph P. Carrier

(57) ABSTRACT

A suspension assembly transport device is configured for transporting a suspension assembly having hubs on both sides, wherein the device includes attachments for being attached to the hubs, receiving members that support the attachments so that the attachments do not move horizontally, left and right arm members on the bottom of which the receiving members are provided, and that are configured to move the receiving members in the width direction of the vehicle, and a transport mechanism that transports the attachments, the receiving members, and the left and right arm members together.

4 Claims, 10 Drawing Sheets

(56) References Cited

U.S. PATENT DOCUMENTS

| | | | | |
|---|---|---|---|---|
| 7,988,239 B1* | 8/2011 | Baker | ................... | B60B 7/04 |
| | | | | 301/37.25 |
| 8,904,653 B1* | 12/2014 | Miaskiewicz | ...... | G01B 11/2755 |
| | | | | 33/203.18 |
| 2007/0020077 A1* | 1/2007 | Burchett | ................ | B60P 3/125 |
| | | | | 414/563 |
| 2008/0264660 A1* | 10/2008 | Berghauser | ............ | B25D 17/08 |
| | | | | 173/80 |
| 2012/0243930 A1* | 9/2012 | Pastoors | .............. | F16B 21/183 |
| | | | | 403/1 |

FOREIGN PATENT DOCUMENTS

| | | |
|---|---|---|
| JP | H01-136083 U | 9/1989 |
| JP | 3186179 B2 | 7/2001 |
| WO | 2007/015381 A1 | 2/2007 |

\* cited by examiner

SUSPENSION ASSEMBLY TRANSPORT DEVICE

TECHNICAL FIELD

The present invention relates to an apparatus for carrying a suspension assembly. The suspension assembly includes, for example, an axle beam extending in a vehicle widthwise direction, a suspension provided on the axle beam, hubs provided on opposite ends of the axle beam, and other members. The suspension assembly is an assembly (pre-assembly) provided prior to being mounted to a vehicle.

BACKGROUND ART

In vehicle assembly factories, suspension assemblies are preliminarily provided and subsequently assembled to vehicle bodies, in order to improve the work efficiency.

Such suspension assemblies are formed in a work process and conveyed to another process where the assemblies are incorporated into the vehicle bodies. The conveyance of the suspension assemblies requires a suspension assembly carrying apparatus. A know type of the suspension assembly carrying apparatus hangs and carries the suspension assembly (patent literature 1 below).

Patent literature 1 teaches three horizontally extending support shafts for supporting a hub. The hub may be horizontally displaced as the hub is carried. Such horizontal displacement of the hub occurs due to the hub being merely placed on the support shafts, and hence it is necessary to take measures to prevent the horizontal displacement.

However, if the suspension assembly carrying apparatus takes account of the measures to prevent the horizontal displacement, the apparatus may be structurally complicated and hence become heavier.

While meeting the need for lightening the apparatus, a structurally simple, lightweight suspension assembly carrying apparatus is desired.

PRIOR ART LITERATURE

Patent Literature

Patent Literature 1: JP-B-3186179

SUMMARY OF INVENTION

Technical Problem

An object of the present invention is to provide a structurally simple, lightweight suspension assembly conveyance apparatus.

Solution to Problem

According to an aspect of the present invention, as defined in claim 1, there is provided a suspension assembly conveyance apparatus for lifting up and conveying a suspension assembly including left and right hubs to be connected to vehicle wheels, the hubs being provided at opposite ends of the assembly in a vehicle widthwise direction, the apparatus comprising:

left and right attachments to be releasably mounted to the hubs from an outside in the vehicle widthwise direction;

receiving members supporting the attachments such that the attachments do not move horizontally;

left and right arm members having the receiving members at lower ends thereof for moving the receiving members in the vehicle widthwise direction; and a carrying mechanism for carrying the attachments, the receiving members and the left and right arm members together.

Preferably, as defined in claim 2, the hub includes an annular portion protruding outwardly in the vehicle widthwise direction to mate with the wheel, and the attachment includes a fitting hole to fit over the annular portion.

Preferably, as defined in claim 3, the attachment includes a body portion, a neck portion extending outwardly from the body portion in the vehicle widthwise direction, and a head portion provided at a distal end of the neck portion. The arm member includes a retention portion having a positioning recess portion fitting over the neck portion, and the neck portion fits in the positioning recess portion by insertion between the body portion and the head portion.

Preferably, as defined in claim 4, the body portion has at least one bolt hole for allowing a wheel fixing bolt to pass through the at least one bolt hole for fixing the wheel to the hub.

Preferably, as defined in claim 5, the bolt hole is an elongated hole extending along a radially extending center-line passing through a center on which the hub rotates.

Advantageous Effects of Invention

Regarding the invention defined in claim 1, the receiving member supports the attachment such that the attachment does not move horizontally. Thus, there is no concern about horizontal displacement of the hub as the hub is carried.

Since the receiving member is only added to the arm member, the conveyance apparatus does not become complicated. The receiving member is structurally simple, and hence the reduction in size and weight is easy.

According to the present invention, thus, there is provided the structurally simple, lightweight suspension assembly conveyance apparatus.

Regarding the invention defined in claim 2, the fitting portion on the side of the hub and the fitting hole on the side of the body portion can bear a load. This results in improvement of the support strength.

Regarding the invention defined in claim 3, the neck portion of the attachment fits in the positioning recess portion of the arm member. The neck portion is easily mounted to or removed from the positioning recess portion. In addition, the attachment is less likely to come off the arm member.

Regarding the invention defined in claim 4, the hub and the attachment can be connected using the wheel fixing bolt in combination with a nut. This eliminates concern about detachment of the attachment from the hub.

Regarding the invention defined in claim 5, the bolt hole is the elongated hole to maintain connection with the wheel fixing bolt even if the wheel fixing bolt is shifted. The conveyance of suspension assemblies of vehicles using different wheel fixing bolts can be achieved by the single conveyance apparatus.

DESCRIPTION OF EMBODIMENTS

Figure 1:
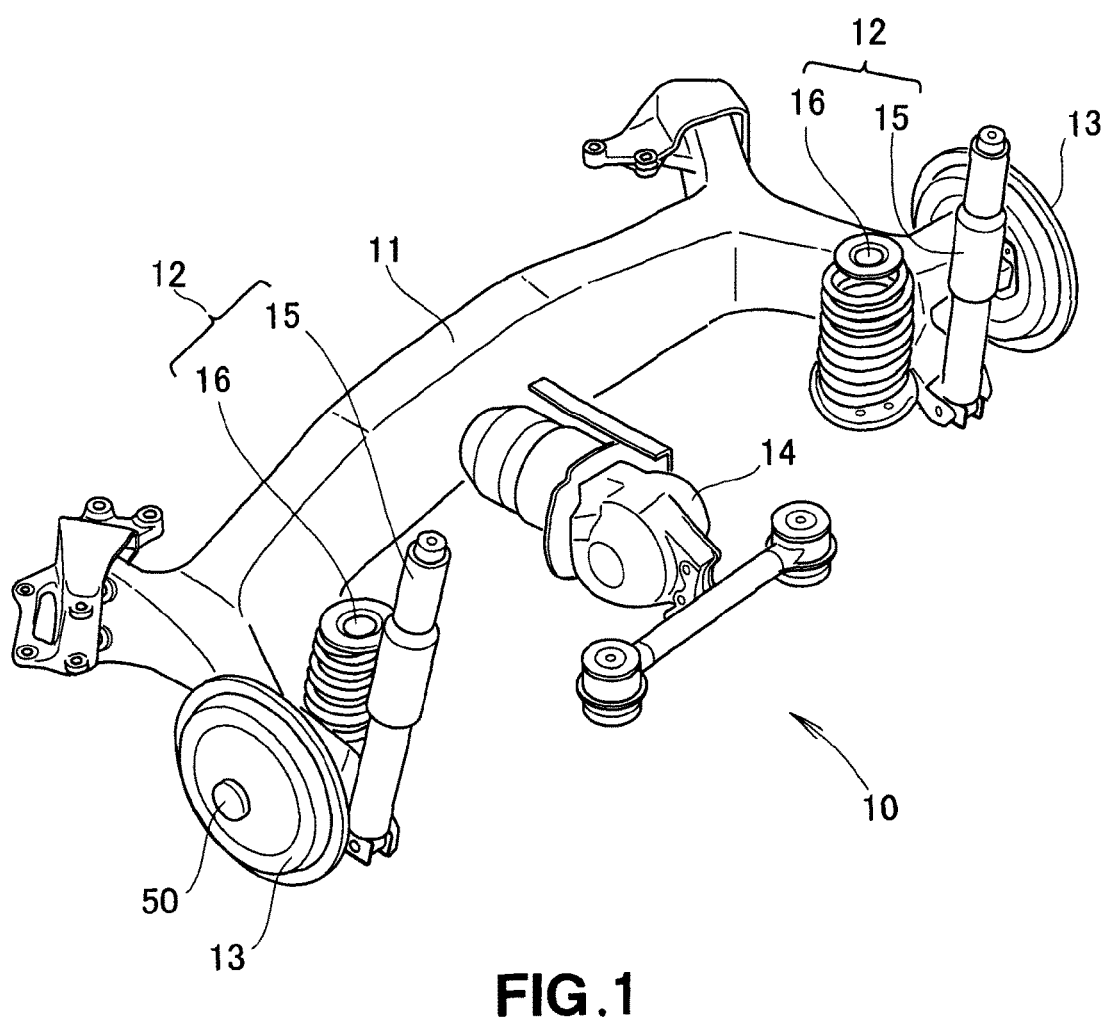
FIG. 1 is a perspective view of a suspension assembly.

Certain preferred embodiments of the present invention are described below with reference to the accompanying drawings. The drawings shall be viewed in the same orientation as reference numerals.

Embodiment

As shown in FIG. 1, a suspension assembly 10 includes an axle beam 11 extending in a vehicle widthwise direction, upwardly extending left and right suspensions 12, 12 mounted on opposite end portions of the axle beam 11, left and right hubs 13, 13 rotatably mounted on opposite ends of the axle beam 11, and a differential case 14 provided on a center of the axle beam 11. To the left and right hubs, wheels are to be mounted in a subsequent process. The suspension 12 includes a damper 15 and a spring 16.

The suspension assembly 10 is preliminarily formed in a location different from a vehicle assembly line. An assembly operation performed on the vehicle assembly line is simple because the suspension assembly 10 is merely mounted to a vehicle body on the assembly line.

The suspension assembly 10 is carried to the vehicle assembly line. A preferred example of a suspension assembly conveyance apparatus 20 used for carrying the assembly 10 is described below.

Figure 2:
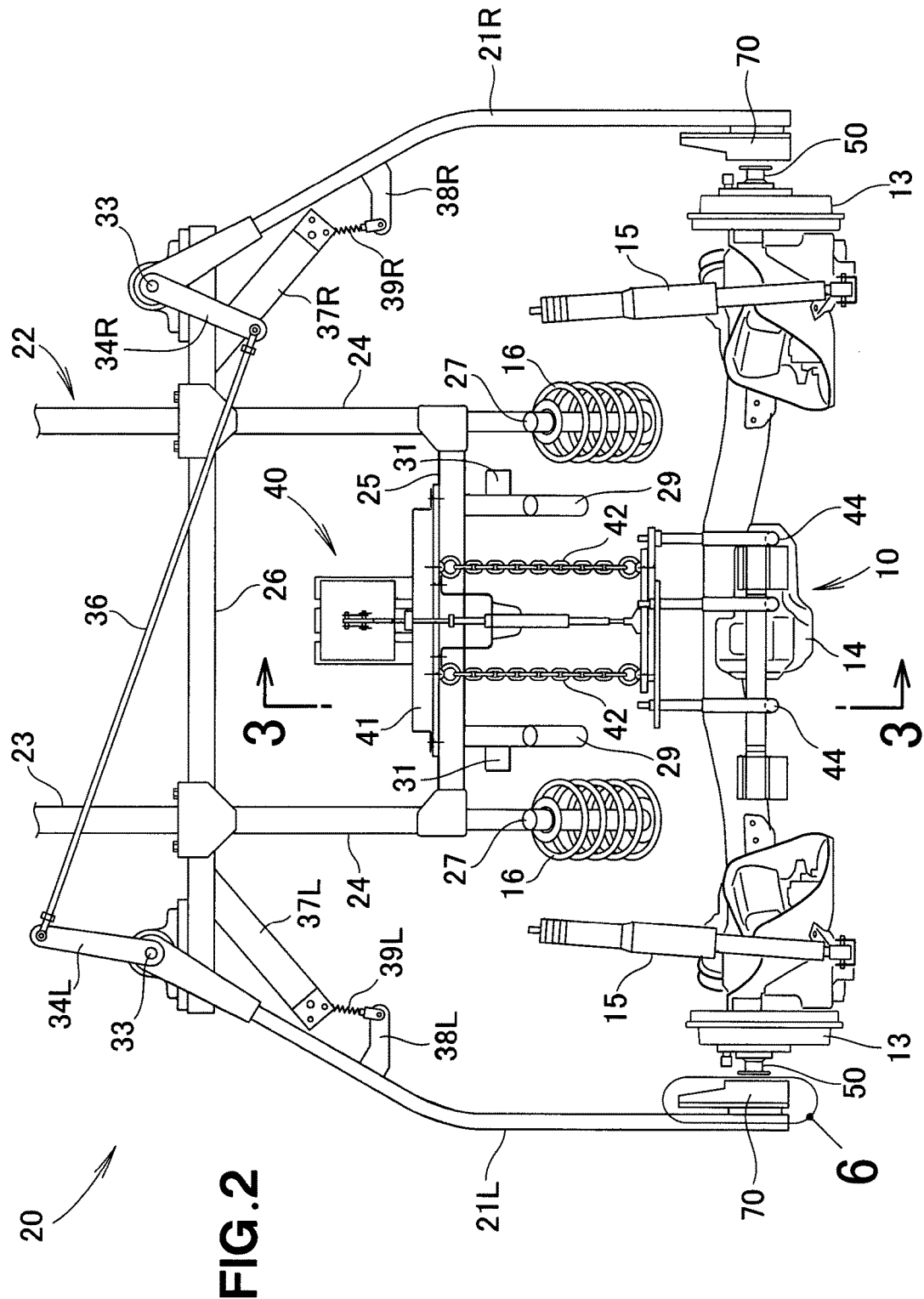
FIG. 2 is a front elevation view of a suspension assembly conveyance apparatus according to the present invention.

As shown in FIG. 2, the suspension assembly conveyance apparatus 20 includes left and right attachments 50, 50 releasably mounted to the hubs 13, 13 from the outside in the vehicle widthwise direction, and left and right arm members 21L, 21R pivotable in the vehicle widthwise direction. The arm members 21L, 21R have receiving members 70, 70 provided at lower ends thereof to mate with the attachments 50, 50. The reference signs "L" and "R" used herein are the suffixes indicating the left and the right, respectively. The apparatus 20 also includes a carrying mechanism 22 for raising and lowering these arm members 21L, 21R and horizontally moving the arm members 21L, 21R.

The carrying mechanism 22 is a so-called overhead conveyer and has a structure including a lifting frame 23 at a lower part thereof. That is, the lifting frame 23 is movable up and down and in a direction orthogonal to a sheet of the figure.

The lifting frame 23 includes horizontal beams 25, 26 interconnecting vertical beams 24, 24. The lower horizontal beam 25 has hooks 27, 27 for hooking the springs 16, 16 which are parts of the suspension assembly. In addition, the lifting frame 23 includes hooks 29, 29 for hooking the left and right attachments 50, 50 when the left and right attachments 50, 50 are not in use. These hooks 29, 29 have boxes 31, 31 for storage of bolts or nuts 66 etc. for mounting of the attachments 50. The horizontal beam 25 has its center equipped with a differential retaining mechanism 40.

The left and right arm members 21L, 21R are supported by support shafts 33, 33 at the middle horizontal beam 26 such that the arm members can pivot in a left-right direction of the figure. A lever 34L extends upwardly from the left arm member 21L, and a lever 34R extends downwardly from the right arm member 21R. A tie rod 36 interconnects these levers 34L, 34R.

A stay 37L extends obliquely in a left and downward direction from the horizontal beam 26. A stay 37R extends obliquely in a right and downward direction from the horizontal beam 26. Arms 38L, 38R extend toward the center from the arm members 21L, 21R. The stay 37L and the arm 38L are connected to each other through a toggle spring 39L. The stay 37R and the arm 38R are connected to each other through a toggle spring 39R.

Figure 3:
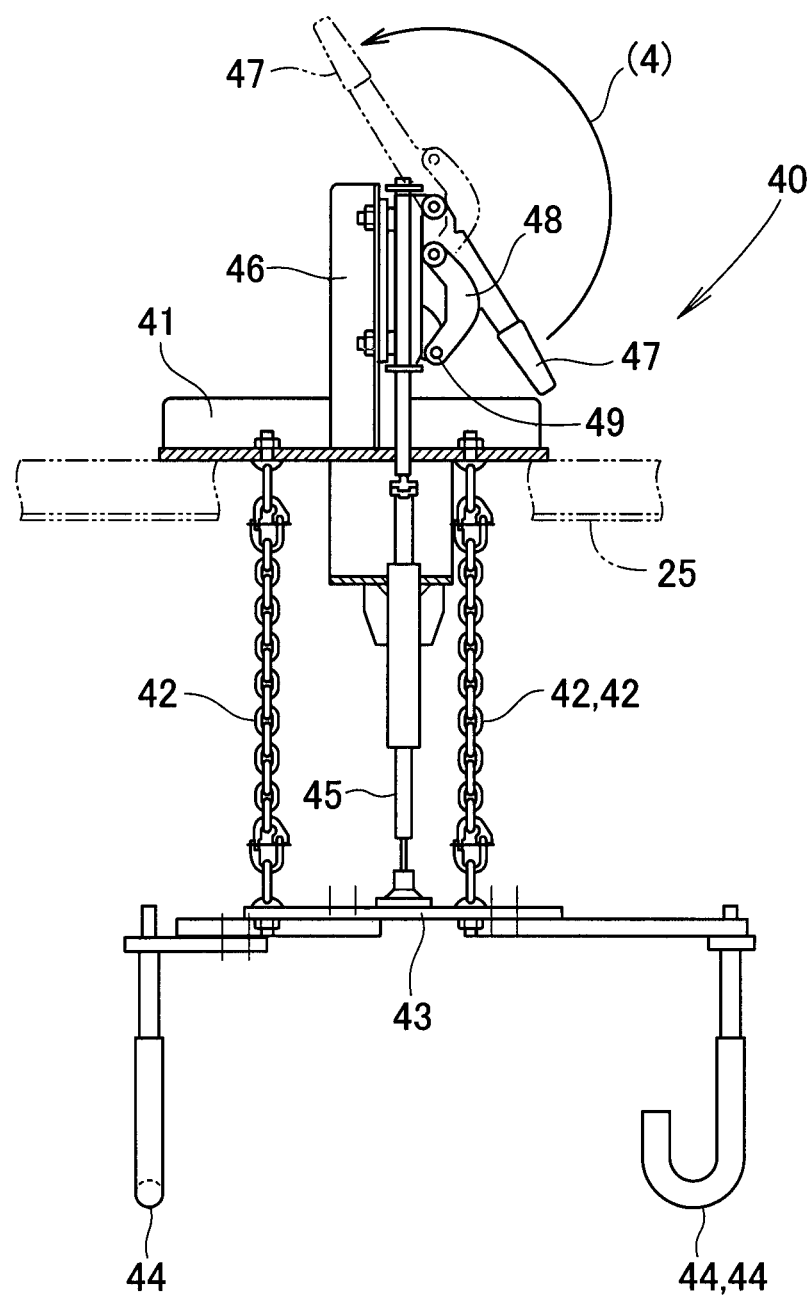
FIG. 3 is a view taken in a direction of arrows 3-3 of FIG. 2.

As shown in FIG. 3, the differential retaining mechanism 40 includes a bracket 41 secured to the horizontal beam 25, and three chains 42, 42, 42 suspended from the bracket 41. Of the three chains, the two right chains 42, 42 are aligned in a direction orthogonal to a sheet of FIG. 3. The differential retaining mechanism 40 also includes a lifting plate 43 hung on the chains 42, 42, 42, and J-shaped hooks 44, 44, 44 provided on the lifting plate 43. The two right hooks 44, 44 are aligned in the direction orthogonal to the sheet of FIG. 3. The differential retaining mechanism 40 further includes a lifting rod 45 extending upwardly from the lifting plate 43, a column member 46 extending upwardly from a center of the bracket 41, a handle 47 vertically pivotably mounted to the column member 46, a V-shaped plate 48 mounted on a base portion of the handle 47, and a pin 49 connecting a lower part of the V-shaped plate 48 to the lifting rod 45 (including its extension member).

When the three chains 42, 42, 42 are brought to a fully extended position to lower the lifting plate 43, it can be centered at a predetermined location. Preferably, the lifting rod 45 is connected at its lower end to the center of gravity of the lifting plate 43 including the J-shaped hooks 44, 44, 44 (the "center of gravity of the lifting plate" used herein including a vicinity of the center of gravity). The connection of the lower end of the lifting rod 45 to the center of gravity enables the lifting plate 43 to be raised and lowered in a horizontal position. Further, when the three chains 42, 42, 42 are located at three apexes of a triangle, respectively, and the lifting rod 45 is connected to the center of gravity of the triangle, such that the lifting plate 43 can be retained in a horizontal position by the chains 42, 42, 42.

As shown in FIG. 2, the J-shaped hooks 44, 44, 44 directly or indirectly engage the differential case 14 to enable the chains 42, 42, 42 to hang the differential case 14.

As shown in FIG. 4(a), the hub 13 includes a boss portion 62 having a bearing 61. The hub 13 also includes a cup-shaped hub body 63 integrally assembled to the boss portion 62, and an annular portion 64 protruding from the hub body 63 to mate with a center of a wheel for bearing a load. The hub 13 further includes plural (four or five) wheel fixing bolts 65 provided on the hub body 63 in such a manner as to surround the annular portion 64.

The attachment 50 includes a disc-shaped body portion 53. The body portion 53 has bolt holes 52, 52L and a fitting hole 51 to fit over the annular portion 64 for use in mounting a typical wheel. The attachment 50 further includes a neck portion 54 extending from the body portion 53, and a head portion 55 provided at a distal end of the neck portion 54. The head portion 55 is larger in diameter than the neck portion 54.

The fitting portion 51 fits over the annular portion 64 by a predetermined length such that the annular portion 64 and the fitting portion 51 are in close contact with each other to define a load-bearing part for simplifying a fastening operation using a nut etc.

The attachment 50 is brought to mate with the hub 13 in close contact with the hub in a manner to allow the bolt holes 52, 52L to fit over the wheel fixing bolts 65. Preferably, at least one nut 66 for temporary fastening is tightened to the wheel fixing bolt 65 to firmly assemble the nut 66 and the bolt 65 together.

The nut 66 is tightened to the hub 13 after the attachment 50 is set with the bolt holes 52, 52L being located at a lower side of the attachment 50. This results in an improved performance of preventing detachment of the attachment 50.

As a result, the attachment 50 is mounted to the hub 13, as shown in FIG. 4(b). Since the arm member (FIG. 2, reference numeral 21L or 21R) presses the attachment 50 against the hub 13, the mounting of the nut 66 can be omitted.

Figure 5:
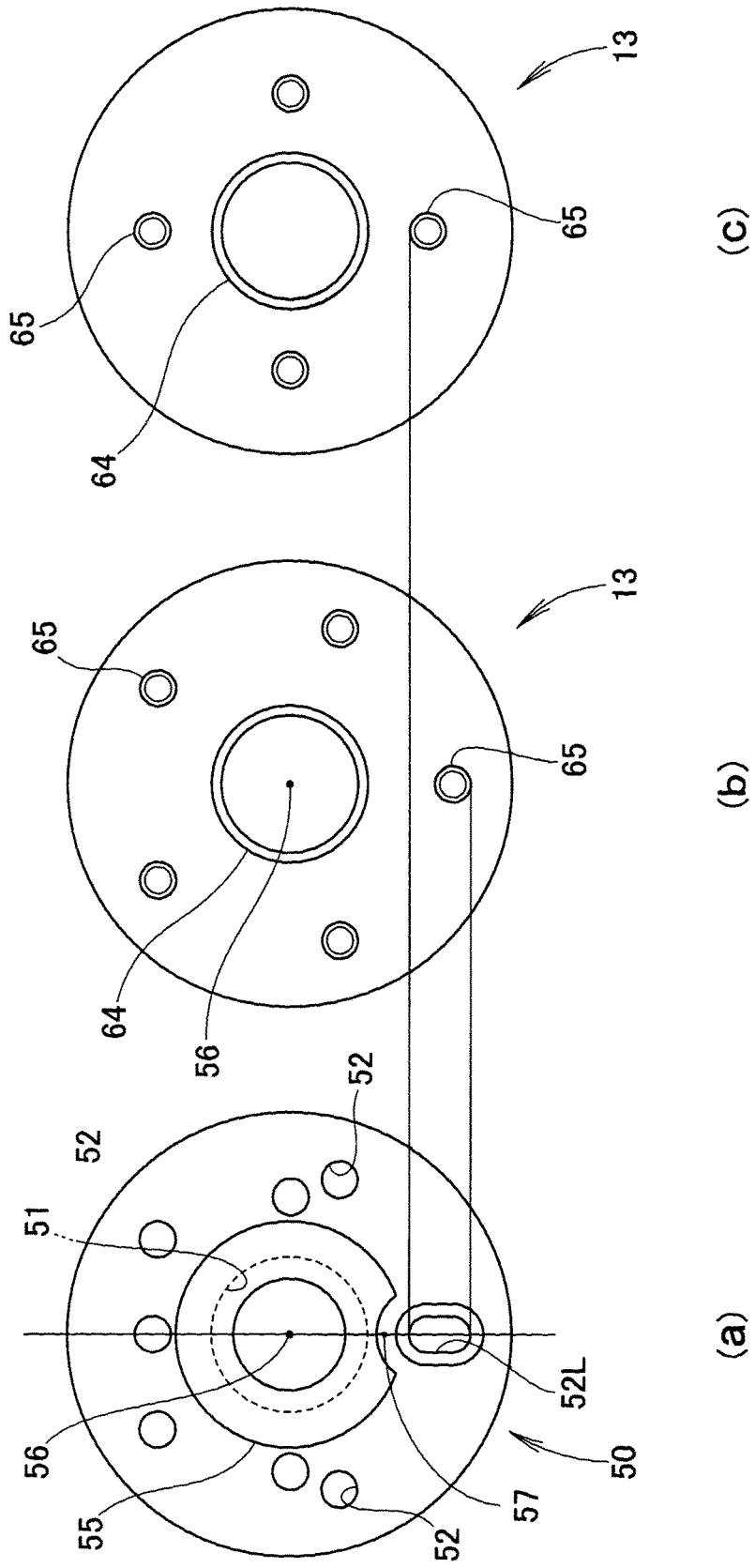
FIG. 5 is a view illustrating a correlation between bolt holes and wheel fixing bolts.

There is one kind of vehicle including the hub 13 having the five wheel fixing bolts 65 as shown in FIG. 5(b). There is another kind of vehicle having the four wheel fixing bolts 65 as shown in FIG. 5(c). The five wheel fixing bolts 65 (FIG. 5(b)) have a pitch circle (PCD) larger than that of the four wheel fixing bolts (FIG. 5(c)) although the outer diameter of the annular portion 64 is common regardless of the kind of vehicle.

As shown in FIG. 5(a), the bolt hole 52L provided in the attachment 50 is a commoditized hole defined by a single elongated hole extending along a radially extending centerline 57 passing through a center 56 on which the hub rotates. The other holes are dedicated holes. The elongated hole has a length set to correspond to the pitch circles of the wheel fixing bolts 65, 65 shown in FIGS. 5(b) and (c).

That is, since the bolt hole 52L is the elongated hole, the single kind of attachment 50 can correspond to the hubs 13, 13 of different sizes or specifications.

The attachment 50 has a hole formed through a longitudinal central region thereof such that the attachment 50 is hooked by the hook 29 provided on the horizontal beam 25 when the attachment 50 is not in use.

Next, the structures of the receiving members 70 provided at the lower ends of the arm members 21L, 21R are discussed.

Figure 6:
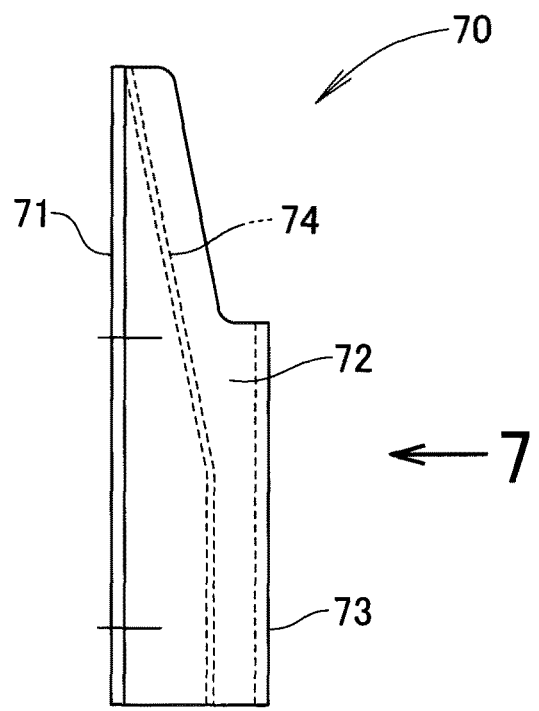
FIG. 6 is an enlarged view of a region 6 of FIG. 2.

As shown in FIG. 6, the receiving member 70 includes a back plate 71, side plates 72 extending from the back plate 71, a retention portion 73 extending between and interconnecting distal ends of the side plates 72, and a guide plate 74 provided between the retention portion 73 and the back plate 71.

Figure 4:
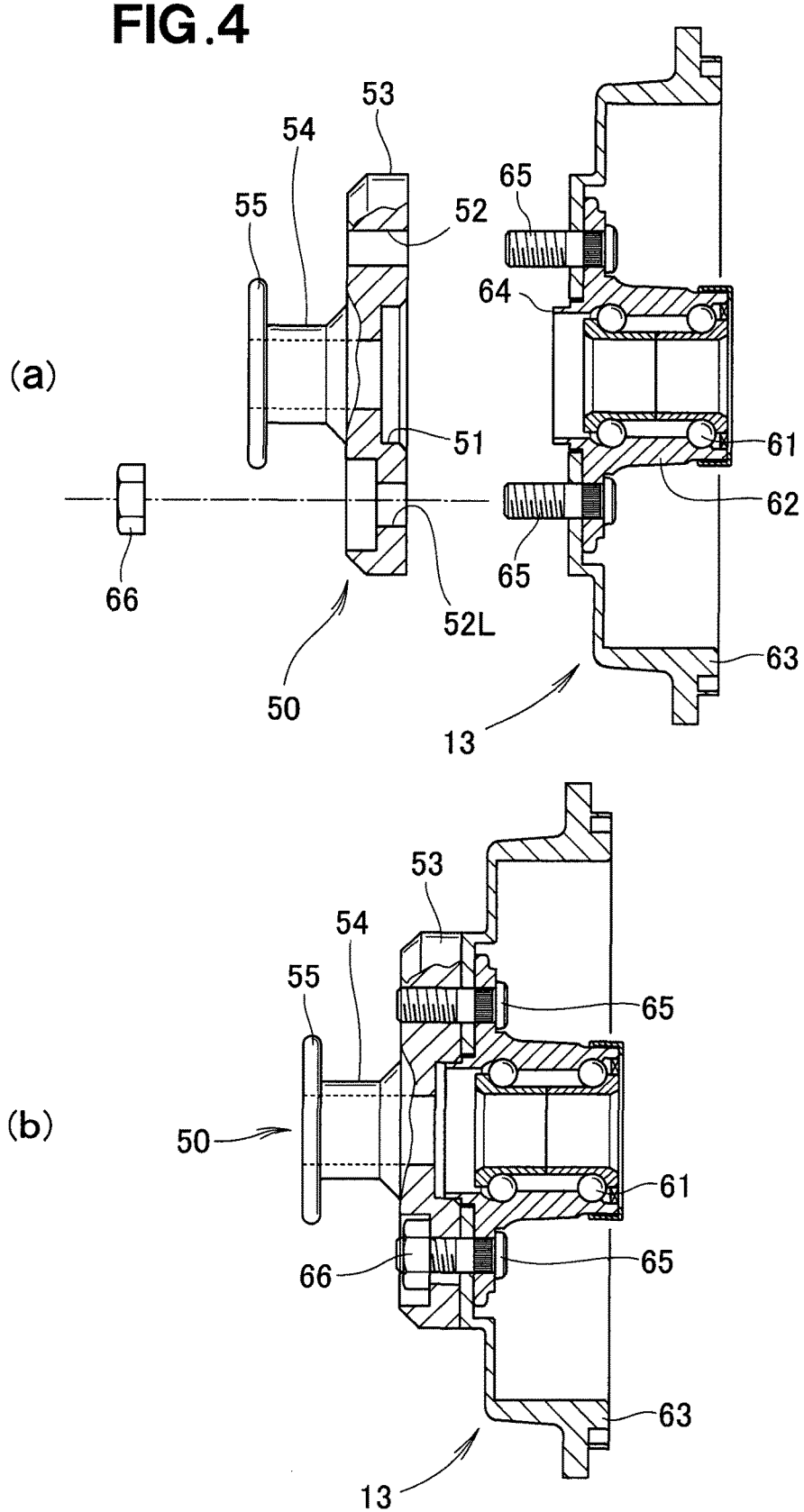
FIG. 4 is a cross-sectional view of a hub and an attachment.
Figure 7:
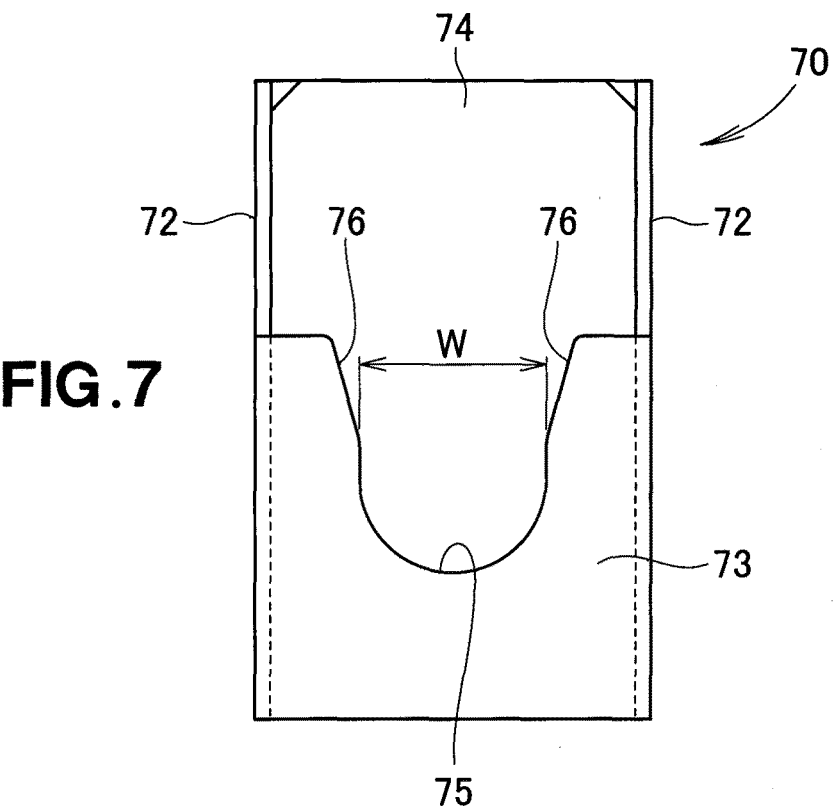
FIG. 7 is a view taken in a direction of an arrow 7 of FIG. 6.

As shown in FIG. 7, the retention portion 73 has a cutout defining an upwardly-open positioning recess portion 75. A width W of the positioning recess portion 75 corresponds to an outer diameter of the neck portion (FIG. 4, reference numeral 54). The positioning recess portion 75 includes an upper part having slanting portions 76, 76 forming a V-shape to guide the neck portion (FIG. 4, reference numeral 54) into the U-shaped positioning recess portion 75 provided on the retention portion 73, such that the head portion 55 guides the neck portion to a predetermined location and prevents the neck portion from coming off. The shape of the positioning recess portion 75 is not limited to that shown in FIG. 7, but can be an upwardly-open U-, V- or other similar shape.

Next, a description is made below as to a function of the suspension assembly conveyance apparatus 20 stated above.

Figure 8:
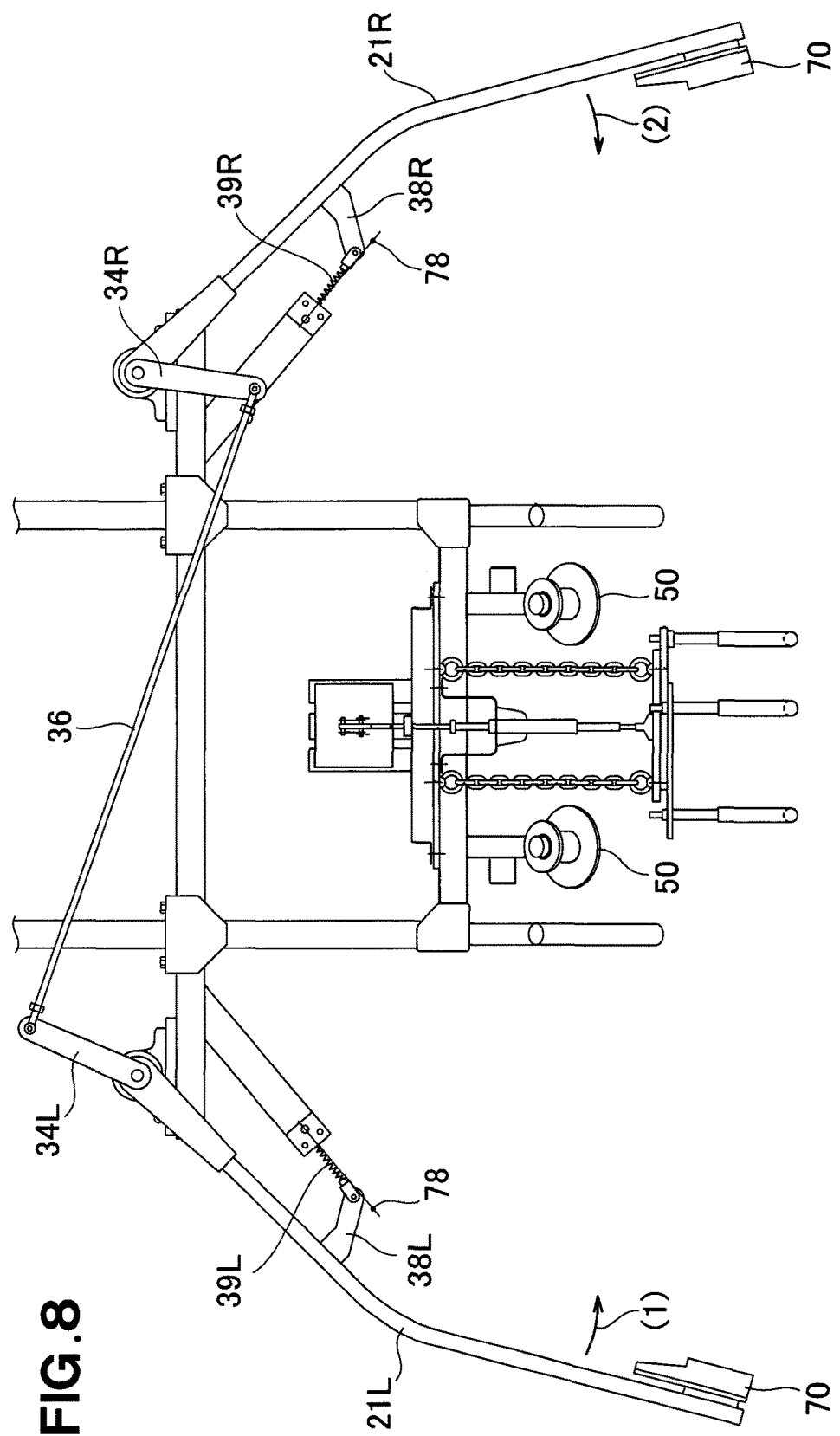
FIG. 8 is a view illustrating arm members in an open position.

Turning to FIG. 8, the left and right arm members 21L, 21R in an open position are lowered. During the lowering of the members 21L, 21R, the toggle springs 39L, 39R in a compressed position are located outside support axes 78, 78. Thus, there is no concern about swaying of the arm members 21L, 21R as the arm members 21L, 21R are raised and lowered.

For example, when the left arm member 21L is pushed with an operator's hand, as indicated by an arrow (1), the lever 34L is turned counterclockwise in the figure to pull the tie rod 36. This causes the right lever 34R to turn clockwise in the figure, such that the right arm member 21 pivots, as indicated by an arrow (2). During the pivotal movement, the arms 38L, 38R move toward the center to allow the toggle springs 39L, 39R to pass across the support axes 78, 78. The toggle springs 39L, 39R provide maximum lengths when the toggle spring 39L, 39R are positioned in coincidence with the support axes 78, 78. After the toggle springs 39L, 39R move past the support axes 78, 78, the arm members 21L, 21R are prompted to pivot under the action of the pulling force of the toggle springs 39L, 39R.

That is, one operator can open and close the two arm members 21L, 21R because the levers 34L, 34R and the tie rod 36 cause the one arm member 21L (or 21R) to pivot in synchronization with the other arm member 21R (or 21L).

Figure 9:
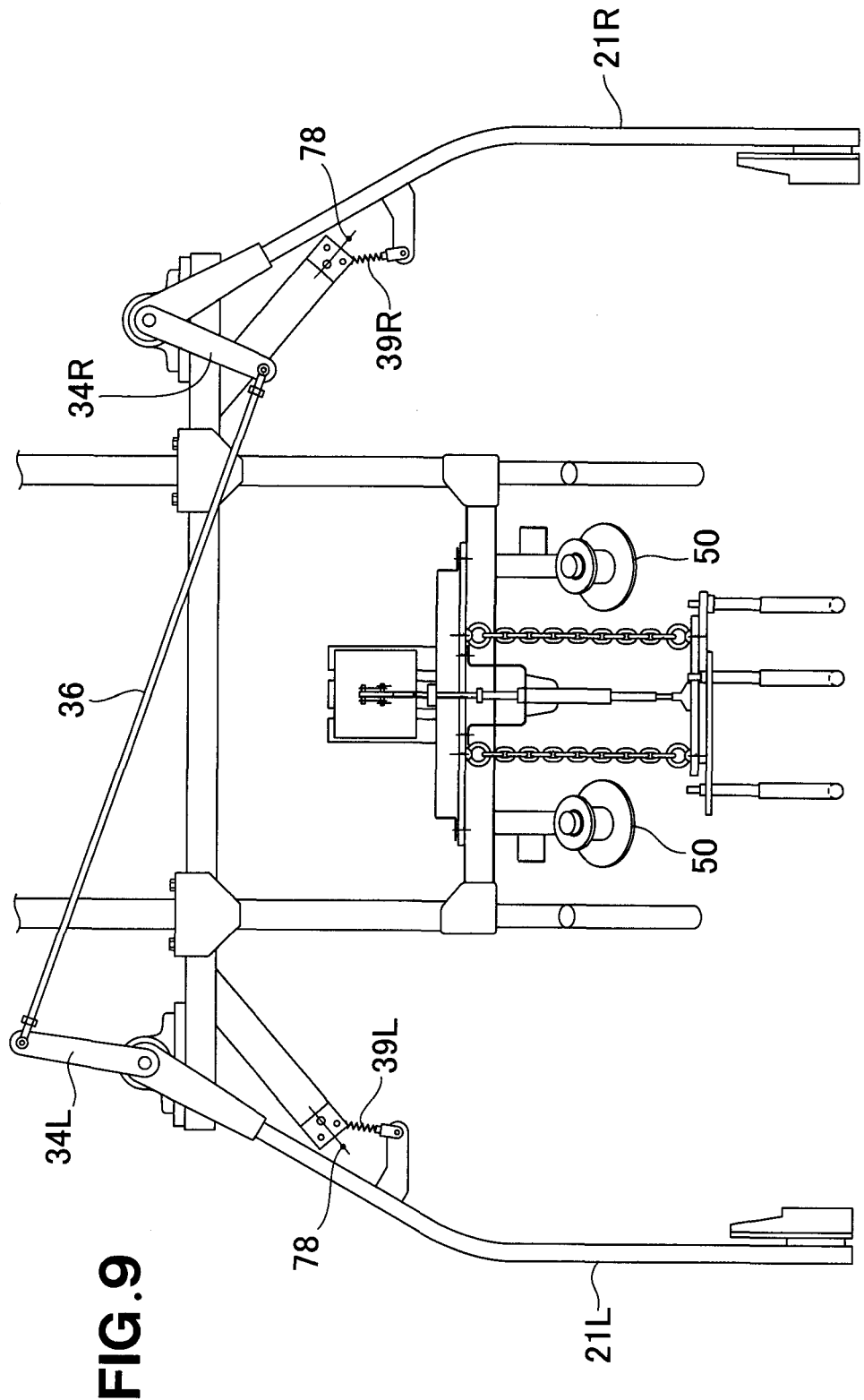
FIG. 9 is a view illustrating the arm members in a closed position.

The pivotal movements indicated by the arrows (1) and (2) bring the arm members 21L, 21R to an almost close position, as shown in FIG. 9.

Figure 10:
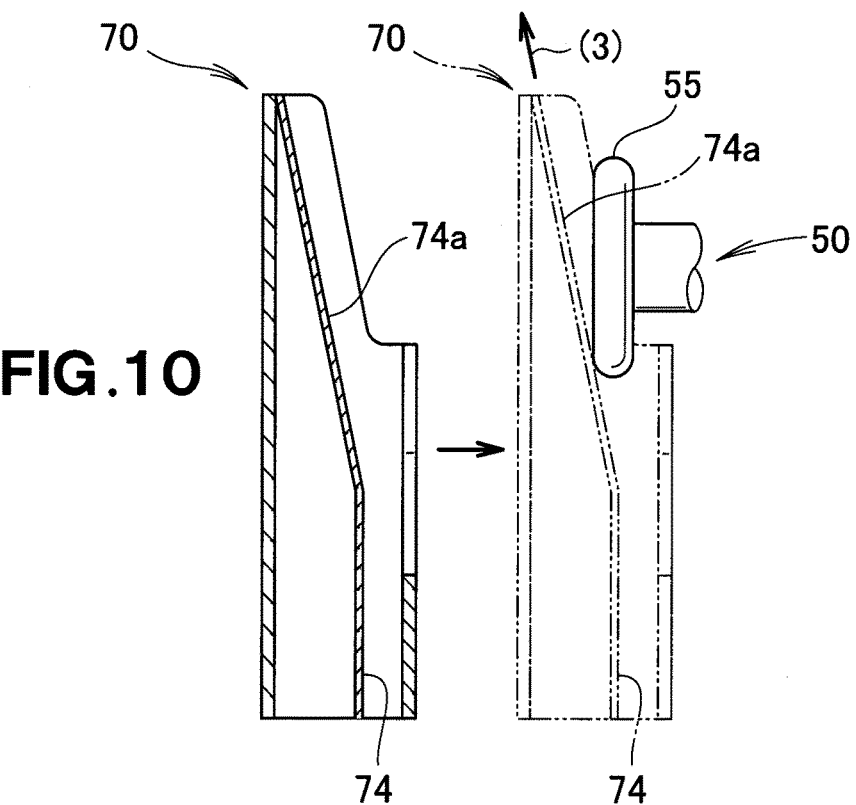
FIG. 10 is a view illustrating a function of a receiving member.

That is, as shown in FIG. 10, the receiving member 70 indicated by a solid line moves to a location indicated by a phantom line, where the receiving member 70 stops with an inclined portion 74a of the guide plate 74 touching the head portion 55 of the attachment 50.

When the receiving member 70 is elevated from the location indicated by the phantom line, the receiving member 70 upwardly slides on the head portion 55, as indicated by an arrow (3).

Figure 11:
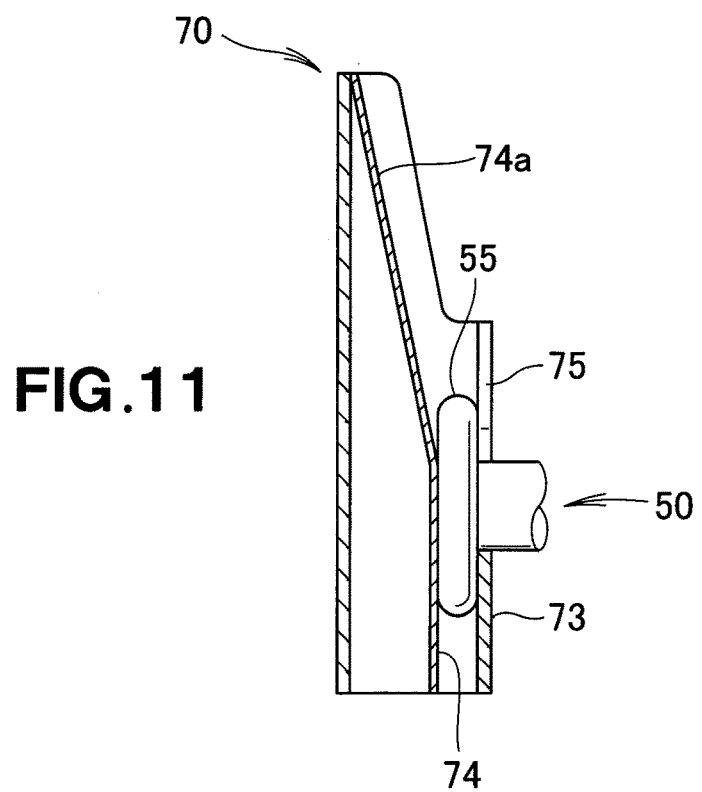
FIG. 11 is a view illustrating the receiving member and a head member fitting together.

As a result, the head portion 55 is sandwiched between the guide plate 74 and the retention portion 73, as shown in FIG. 11. After that, there is no concern about removal of the head portion 55, i.e., removal of the attachment 50 from the receiving member 70 as the receiving member 70 is raised.

In FIG. 2, at the time the attachments 50, 50 fit into the receiving members 70, 70, the chains 42, 42, 42 fully extend such that the J-shaped hooks 44, 44, 44 positioned in place is located lower than the differential case 14.

In FIG. 3, the handle 47 is subsequently elevated as indicated by an arrow (4). Then, the lifting rod 45 is raised to bring the J-shaped hooks 44, 44, 44 into direct or indirect engagement with the differential case 14, such that the differential retaining mechanism 40 retains the differential case 14, thereby eliminating concern about loads being borne by the arm members 21L, 21R during the conveyance.

The left and right arm members 21L, 21R are not limited to the pivotal arms, but may be provided as modified ones discussed below.

Figure 12:
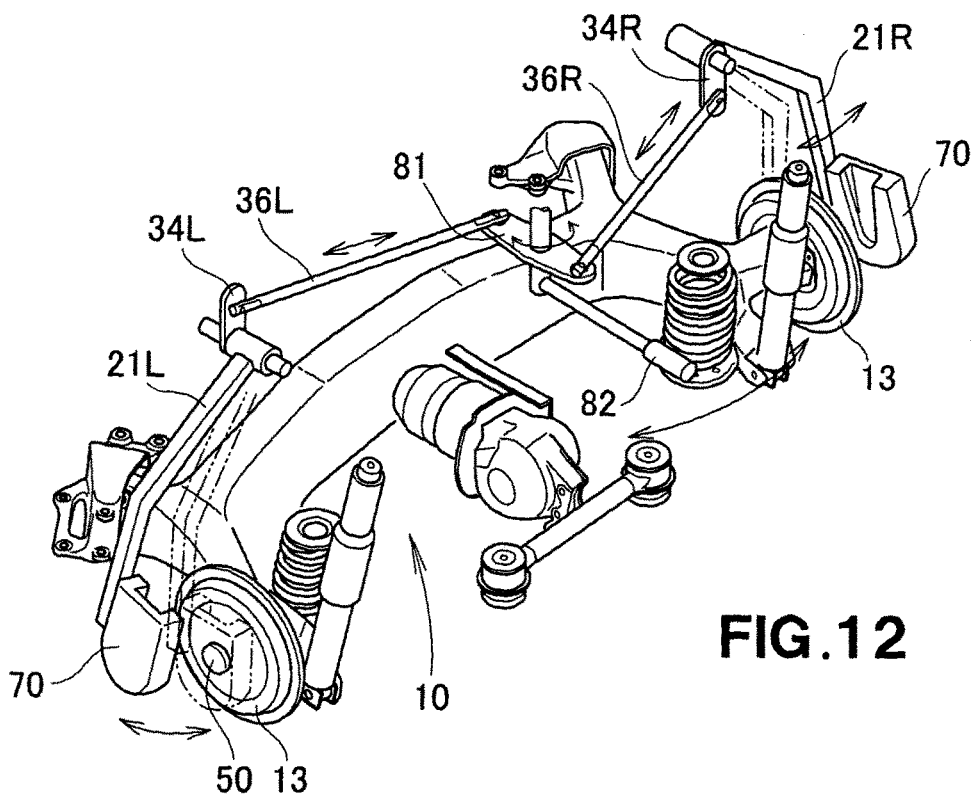
FIG. 12 is a view illustrating an modification to the arm members.

As shown in FIG. 12, the tie rod is divided into left and right ones. The left tie rod 36L has its center end mounted to a horizontal turn lever 81, and the left tie rod 36R has its center end mounted to the horizontal turn lever 81. The horizontal lever 81 may be turned by a handle 82. In respect with the other elements, reference numerals shown in FIG. 2 are used, and discussions of these elements are omitted.

Figure 13:
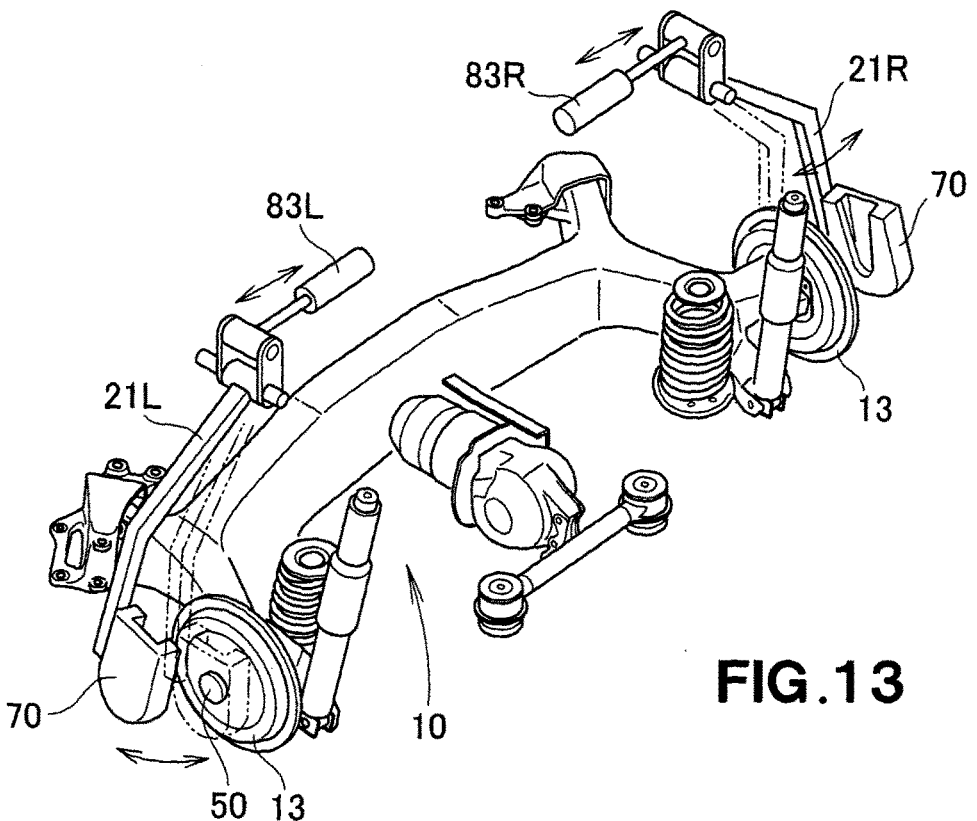
FIG. 13 is a view illustrating a further modification to the arm members.

As shown in FIG. 13, the left arm member 21L may be pivoted by a left actuator 83L, and the right arm member 21R may be pivoted by a right actuator 83R. The actuators 83L, 83R are preferably air cylinder units.

Although the present invention is suitable for conveyance of a rear suspension assembly, the invention may be applied to a front suspension assembly.

INDUSTRIAL APPLICABILITY

The present invention is suitable for conveyance of a suspension assembly having hubs without wheels being mounted thereto.

REFERENCE SIGNS LIST

10 . . . a suspension assembly, 11 . . . an axle beam, 12 . . . a suspension, 13 . . . a hub, 20 . . . a suspension assembly conveyance apparatus, 21L, 21R . . . arm members, 22 . . . a carrying mechanism, 50 . . . an attachment, 51 . . . a fitting hole, 52L . . . an elongated bolt hole, 53 . . . a body portion, 54 . . . a neck portion, 55 . . . a head portion, 56 . . . a center on which the hub rotates, 57 . . . a centerline, 64 . . . an annular portion, 65 . . . a wheel fixing bolt, 70 . . . a receiving member, 73 . . . a retention portion, 75 . . . a positioning recess portion, W . . . a width of the positioning recess portion

The invention claimed is:

1. A suspension assembly conveyance apparatus for lifting up and conveying a suspension assembly including left and right hubs to be connected to vehicle wheels, the hubs being provided at opposite ends of the assembly in a vehicle widthwise direction, the apparatus comprising:
  left and right attachments configured to be releasably mounted to the hubs from an outside in the vehicle widthwise direction;
  receiving members for supporting the attachments such that the attachments do not move horizontally in relation to corresponding the receiving members;
  left and right arm members having the receiving members at lower ends thereof, said arm members provided for moving the receiving members in the vehicle widthwise direction; and
  a carrying mechanism for carrying the attachments, the receiving members and the left and right arm members together,
  wherein each of the attachments includes a disc-shaped body portion having a fitting hole formed coaxially and centrally therein and configured to receive an annular portion of the hub, where said annular portion protrudes outwardly in the vehicle widthwise direction.

2. A suspension assembly conveyance apparatus for lifting up and conveying a suspension assembly including left and right hubs to be connected to vehicle wheels, the hubs being provided at opposite ends of the assembly in a vehicle widthwise direction, the apparatus comprising:
  left and right attachments to be releasably mounted to the hubs from an outside in the vehicle widthwise direction;
  receiving members supporting the attachments such that the attachments do not move horizontally in relation to corresponding the receiving members;
  left and right arm members having the receiving members at lower ends thereof for moving the receiving members in the vehicle widthwise direction; and
  a carrying mechanism for carrying the attachments, the receiving members and the left and right arm members together,
  wherein the hub includes an annular portion protruding outwardly in the vehicle widthwise direction to mate with the wheel,
  wherein the attachment includes a fitting hole configured to fit over the annular portion,
  wherein the attachment includes a body portion, a neck portion extending outwardly from the body portion in the vehicle widthwise direction, and a head portion provided at a distal end of the neck portion,
  wherein the arm member includes a retention portion having a positioning recess portion fitting over the neck portion, and
  wherein the neck portion fits in the positioning recess portion by insertion between the body portion and the head portion.

3. The apparatus of claim 2, wherein the body portion has at least one bolt hole for allowing a wheel fixing bolt to pass through the at least one bolt hole for fixing the wheel to the hub.

4. The apparatus of claim 3, wherein the bolt hole is an elongated hole extending along a radially extending centerline passing through a center on which the hub rotates.

* * * * *